United States Patent
Huang et al.

(10) Patent No.: US 9,094,807 B2
(45) Date of Patent: Jul. 28, 2015

(54) METHODS AND APPARATUS FOR PROVIDING AN INCENTIVIZED COOPERATIVE SYSTEM FOR ACCESSING RADIO ACCESS NETWORKS

(75) Inventors: Xiaolong Huang, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 13/479,082

(22) Filed: May 23, 2012

(65) Prior Publication Data

US 2013/0316681 A1 Nov. 28, 2013

(51) Int. Cl.
*H04W 40/00* (2009.01)
*H04W 4/16* (2009.01)
*H04W 4/24* (2009.01)
*H04W 88/04* (2009.01)
*H04L 12/14* (2006.01)
(Continued)

(52) U.S. Cl.
CPC .............. *H04W 4/16* (2013.01); *H04L 12/1457* (2013.01); *H04L 12/1478* (2013.01); *H04M 15/8083* (2013.01); *H04M 15/93* (2013.01); *H04W 4/24* (2013.01); *H04W 88/04* (2013.01); *H04W 76/02* (2013.01); *H04W 76/025* (2013.01); *H04W 84/18* (2013.01)

(58) Field of Classification Search
CPC ......... H04W 88/04; H04W 4/16; H04W 4/24; H04W 76/02; H04W 76/025; H04W 84/18
USPC ............... 340/425.1; 455/7, 11.1, 422.1, 445, 455/552.1; 705/1.1, 14.1, 39, 40
See application file for complete search history.

(56) References Cited

U.S. PATENT DOCUMENTS 7,330,457 B2 2/2008 Panwar et al.
7,788,387 B2 8/2010 Kumar et al.
(Continued)

FOREIGN PATENT DOCUMENTS

GB 2408173 5/2005
WO WO-0251038 A1 6/2002

OTHER PUBLICATIONS

Zhang, et al. "C4: A New Paradigm for Providing Incentives in Multi-hop Wireless Networks," INFOCOM, 2011 Proceedings IEEE, pp. 918-926.
(Continued)

*Primary Examiner* — Charles Appiah
*Assistant Examiner* — Jaime Holliday
(74) *Attorney, Agent, or Firm* — Jeffrey D. Jacobs

(57) ABSTRACT

Methods and apparatus are disclosed for providing improved service to wireless devices in a radio access network (RAN). This is accomplished through affording cooperative arrangements wherein a helper mobile device having a good link to the RAN assists another mobile device having a poorer quality link to access the RAN, thereby offering improved service. The arrangement includes an out of band link between the mobile devices that does not use the same radio access technology as the RAN. Additionally, an incentive scheme provides credit to users of the assisting devices that is configured to encourage and sustain future cooperative arrangements. Credit may be transferred from a user of the assisted device to the user of the helper device as compensation. Further, an operator of the RAN may also inject credit to users of helper devices to incentivize and sustain future cooperative arrangements.

43 Claims, 9 Drawing Sheets

(51) Int. Cl.
*H04M 15/00* (2006.01)
*H04W 76/02* (2009.01)
*H04W 84/18* (2009.01)

(56) References Cited

U.S. PATENT DOCUMENTS

| | | | |
|---|---|---|---|
| 2003/0220074 A1* | 11/2003 | Wee et al. | 455/11.1 |
| 2005/0222948 A1* | 10/2005 | Sato et al. | 705/40 |
| 2005/0227616 A1* | 10/2005 | Takatani et al. | 455/11.1 |
| 2006/0252416 A1 | 11/2006 | Du et al. | |
| 2007/0053338 A1 | 3/2007 | Sandhu et al. | |
| 2008/0037499 A1* | 2/2008 | Kumar et al. | 370/342 |
| 2010/0039947 A1* | 2/2010 | Li et al. | 370/252 |
| 2010/0056161 A1* | 3/2010 | Matsumura | 455/445 |
| 2011/0038301 A1 | 2/2011 | Park | |
| 2013/0295986 A1* | 11/2013 | Mueck | 455/552.1 |

OTHER PUBLICATIONS

International Search Report and Written Opinion—PCT/US2013/042506—ISA/EPO—Nov. 11, 2013.
Partial International Search Report—PCT/US2013/042506—ISA/EPO—Oct. 2, 2013.
Willis B et al: "Exploiting Peer-To-Peer Communications-Mesh Fixed and ODMA Mobile Radio", Journal of the Institution of British Telecommunications Egineers, British Telecommunications Engineering, London, GB, vol. 2, No. Part 02, Apr. 1, 2001, pp. 48-53, XP001059211, ISSN: 1470-5826.

* cited by examiner

Session 1

Session 2

METHODS AND APPARATUS FOR PROVIDING AN INCENTIVIZED COOPERATIVE SYSTEM FOR ACCESSING RADIO ACCESS NETWORKS

BACKGROUND

1. Field

The present disclosure relates generally to wireless communication systems, and more specifically to methods and apparatus for providing an incentivized cooperative system for accessing radio access networks that provides incentives for encouraging cooperation to access the radio access networks.

2. Background

In wireless communication systems, the available capacity for a mobile wireless device to access a radio access network (RAN) can be limited at times due to poor channel conditions, limited transmission power, and base station scheduling constraints. When the available capacity is so limited, this situation may give rise to applications or operations on a mobile device that may require much higher throughput than a regular best effort RAN bearer can provide to that mobile device, thus diminishing user experience.

In some known wireless systems, such as peer-to-peer systems, it is known to allow one mobile device to utilize other devices in an assisting function to provide better throughput and capacity to either other peer devices or a base station. These systems, however, are limited to the use of same radio access technology (RAT) between all devices. Thus, in certain situations, access to a RAN may be limited by conditions affecting all users of the same RAT, for example. Additionally, in known systems where cooperative access allows one user to assist another user, the capacity of the assisting user device to access the RAN may be limited due to sharing its resources with another user device. As incentive to encourage cooperative use and sharing of resources, providing compensation to assisting users is beneficial to ensure the success of such schemes.

Accordingly, it is desirable to provide a schema to better increase individual users' mobile device's RAN access throughput through cooperation with other user devices that also increases cell capacity, as well to provide incentivizing schemes to encourage such cooperative access from both users' and operators' perspectives.

SUMMARY

According to an aspect, a method for providing improved service to a wireless device in a radio access network is disclosed. The method includes determining one or more helper wireless devices capable of assisting the wireless device to improve radio access network service to the wireless device via a respective link of the one or more helper devices with the radio access network. Further, the method includes selecting at least one helper device of the determined one or more helper wireless devices to assist the wireless device in obtaining improved service from the radio access network. Additionally, the method includes establishing a wireless link between the wireless device and the selected at least one helper device allowing the wireless device to communicate with the network via the at least one helper device, wherein the wireless link is an out of band wireless link not communicating within the radio access network. In addition, a transfer of credit is signaled to the selected at least one helper device to compensate the helper device for providing the wireless device access to the radio access network.

According to another aspect, an apparatus for providing improved service to a wireless device in a radio access network disclosed. The apparatus includes at least one processor configured to determine one or more helper wireless devices capable of assisting the wireless device to improve radio access network service to the wireless device via a respective link of the one or more helper devices with the radio access network. Additionally, the processor is configured to select at least one helper device of the determined one or more helper wireless devices to assist the wireless device in obtaining improved service from the radio access network. Still further, the processor is configured to establish a wireless link between the wireless device and the selected at least one helper device allowing the wireless device to communicate with the network via the at least one helper device, wherein the wireless link is an out of band wireless link not communicating within the radio access network. The at least one processor is also configured to signal a transfer of credit to the selected at least one helper device to compensate the helper device for providing the wireless device access to the radio access network. The apparatus also includes a memory in communication with the at least one processor.

In another aspect, an apparatus is disclosed for providing improved service to a wireless device in a radio access network. The apparatus includes means for determining one or more helper wireless devices capable of assisting the wireless device to improve radio access network service to the wireless device via a respective link of the one or more helper devices with the radio access network. In addition, the apparatus includes means for selecting at least one helper device of the determined one or more helper wireless devices to assist the wireless device in obtaining improved service from the radio access network. Further, the apparatus includes means for establishing a wireless link between the wireless device and the selected at least one helper device allowing the wireless device to communicate with the network via the at least one helper device, wherein the wireless link is an out of band wireless link not communicating within the radio access network. Finally, the apparatus includes means for signaling a transfer of credit to the selected at least one helper device to compensate the helper device for providing the wireless device access to the radio access network.

According to another aspect, a computer program product comprising a computer-readable medium is disclosed. The medium includes code for causing a computer to determine one or more helper wireless devices in a radio access network capable of assisting a wireless device in a radio access network to obtain improved radio access network service for the wireless device via a respective link of the one or more helper devices with the radio access network. Also, the medium includes code for causing a computer to select at least one helper device of the determined one or more helper wireless devices to assist the wireless device in obtaining improved service from the radio access network. Further, the medium includes code for causing a computer to establish a wireless link between the wireless device and the selected at least one helper device allowing the wireless device to communicate with the network via the at least one helper device, wherein the wireless link is an out of band wireless link not communicating within the radio access network. In addition, the medium includes code for causing a computer to signal a transfer of credit to the selected at least one helper device to compensate the helper device for providing the wireless device access to the radio access network.

In another aspect, the present disclosure provides a method for providing improved service to a wireless device in a radio access network. The disclosed method includes receiving a request from another primary wireless device for improved service from a radio access network by using a radio access network connection of the wireless device. Next, the method includes establishing an out of band wireless link between the wireless device and the primary wireless device allowing the primary wireless device to utilize the radio access network connection of the wireless device for access to the radio access network. Further, the method includes receiving a transfer of credit from at least one of the primary device and an operator of the radio access network for providing the primary device access to the radio access network.

In another disclosed aspect, an apparatus provides improved service to a wireless device in a radio access network by including means for receiving a request from another primary wireless device for improved service from a radio access network by using a radio access network connection of the wireless device. The apparatus also includes means for establishing an out of band wireless link between the wireless device and the primary wireless device allowing the primary wireless device to utilize the radio access network connection of the wireless device for access to the radio access network. The apparatus also includes means for receiving a transfer of credit from at least one of the primary device and an operator of the radio access network for providing the primary device access to the radio access network.

According to still another disclosed aspect, an apparatus for providing improved service to a wireless device in a radio access network is disclosed. The apparatus includes at least one processor that is configured to receive a request from another primary wireless device for improved service from a radio access network by using a radio access network connection of the wireless device. The at least one processor is further configured to establish an out of band wireless link between the wireless device and the primary wireless device allowing the primary wireless device to utilize the radio access network connection of the wireless device for access to the radio access network. Further, the at least one processor is configured to receive a transfer of credit from at least one of the primary device and an operator of the radio access network for providing the primary device access to the radio access network. Finally, the apparatus includes a memory in communication with the at least one processor.

In yet another aspect, a computer program product comprising a computer-readable medium is disclose where the medium includes code for causing a computer to receive a request in a wireless device from another primary wireless device for improved service from a radio access network by using a radio access network connection of the wireless device. The medium also includes code for causing a computer to establish an out of band wireless link between the wireless device and the primary wireless device allowing the primary wireless device to utilize the radio access network connection of the wireless device for access to the radio access network. Furthermore, the medium includes code for causing a computer to receive a transfer of credit from at least one of the primary device and an operator of the radio access network for providing the primary device access to the radio access network.

Furthermore, according to another aspect, a method for providing improved service to a wireless device in a radio access network is disclosed where the method includes determining when a first wireless device is initiating an upgraded connection with the radio access network by using at least one second assisting wireless device assisting the first wireless device in at least one cooperative session. Additionally, the method includes determining an incentive credit to transfer to the assisting second wireless device based at least on energy costs incurred by the second wireless device for the at least one cooperative session.

According to yet another aspect, an apparatus for providing improved service to a wireless device in a radio access network is disclosed. The apparatus includes means for determining when a first wireless device is initiating an upgraded connection with the radio access network by using at least one second wireless device assisting the first wireless device in at least one cooperative session. Additionally, the apparatus includes means for determining an incentive credit to transfer to the assisting second wireless device based at least on energy costs incurred by the second wireless device for the at least one cooperative session.

According to another aspect, an apparatus for providing improved service to a wireless device in a radio access network is disclosed. The apparatus includes at least one processor configured to determine when a first wireless device initiates an upgraded connection with the radio access network by using at least one second wireless device assisting the first wireless device in at least one cooperative session. The at least one processor is also configured to determine an incentive credit to transfer to the assisting second wireless device based at least on energy costs incurred by the second wireless device for the at least one cooperative session. Further, the apparatus includes a memory in communication with the at least one processor.

According to yet one more aspect, a computer program product comprising a computer-readable medium is disclosed, the medium including code for causing a computer to determine when a first wireless device initiates an upgraded connection with a radio network by using at least one second wireless device assisting the first wireless device in at least one cooperative session for accessing the radio network. Further, the medium includes code for causing a computer to determine an incentive credit to transfer to the assisting second wireless device based at least on energy costs incurred by the second wireless device for the at least one cooperative session.

DETAILED DESCRIPTION

The present description discloses methods and apparatus for providing a schema to better increase an individual users mobile device's RAN access throughput through cooperation with other user devices, which also increases cell capacity, as well as to provide incentivizing schemes to encourage such cooperative access from both users' and operators' perspectives.

It is first noted that the word "exemplary" is used herein to mean "serving as an example, instance, or illustration." Any embodiment described herein as "exemplary" is not necessarily to be construed as preferred or advantageous over other embodiments.

Cooperative System

According to an aspect of the present disclosure, a particular mobile's RAN access capacity may be increased by providing mobile-to-mobile cooperation for RAN access. In particular, a mobile device (termed herein as a "primary" or "assisted" device) seeking to increase capacity is linked to another mobile device with greater capacity (termed a "helper" device), which in turn provides its resources (i.e., connection to the RAN) to primary mobile device to provide greater capacity. An example of a cooperative system to implement this aspect is illustrated by FIG. 1.

Figure 1:
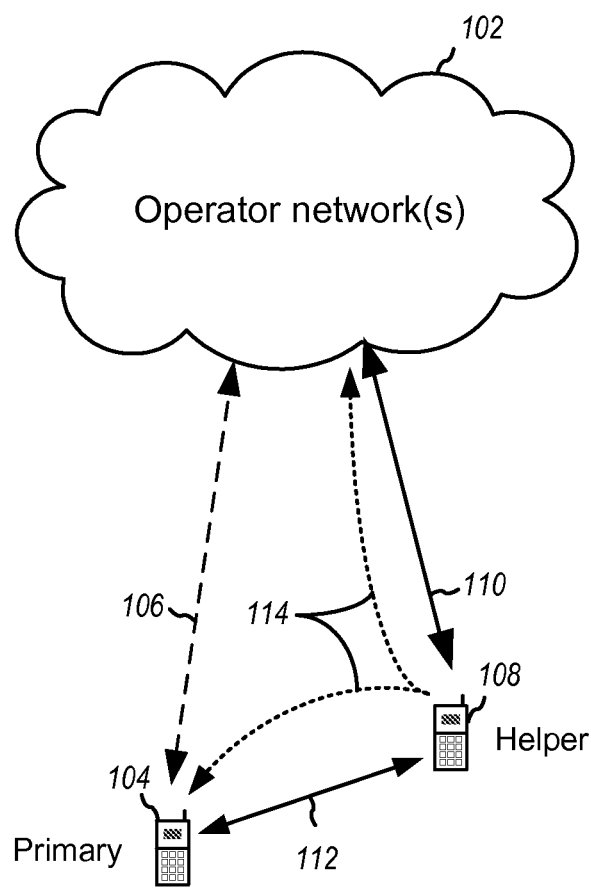
FIG. 1 is an illustration of an exemplary cooperative system according to the present disclosure.

As shown in FIG. 1, the system 100 includes at least one operator network 102. Although shown representationally as a cloud in FIG. 1, the network or networks may include one or more base stations, NodeB's, eNodeB's, or another type of radio access point(s) for access to a RAN or RANs. The network 102 also may include network controllers, backhaul, backbone, and other links such as IP or Internet links, as well as the operator(s) core networks. Furthermore, the represented cloud 102 is not limited to merely one RAN or RAT and operator, but may be considered also to include multiple types of RANs and/or RATs, as well as multiple operators of corresponding RANs.

System 100, as illustrated, includes a primary mobile device 104 that is communication with at least one RAN of the network 102 via a direct radio link 106. The mobile device 104 and any other mobile devices may also be referred to as a mobile terminal, user equipment (UE), a wireless communication device, terminal, access terminal, or some other terminology dependent on the particular RAT.

In an aspect, it is assumed that the link 106 between a primary mobile device 104 and the at least one RAN 102 is determined to be of poor capacity or limited transmission power. This determination may be effected within mobile device 104 or within the network 102 and communicated to the mobile device 104 by the network. In such case, the present methods and apparatus serve to increase capacity for the mobile device through the assistance of another mobile device having a better RAN link to either the same RAN or a different RAN (shown collectively as network 102 as explained above).

As an illustration of the presently disclosed methods and apparatus for increasing capacity through cooperative assistance, it is assumed that a potential helper mobile device 108 enjoys good channel conditions and transmission power via its respective link 110 with the RAN(s) 102. In a cooperative helper situation, the primary device 104 may link with a helper device 108 via another wireless link 112 to allow the primary device 104 to utilize the helper device's link 110 to the RAN 102. In an aspect, the helper device 108 allows or grants permission to the primary 104 for usage of its link 110. This permission or allowance may be actively granted by a user of device 108 in one example, but could also be implemented with an automated type of permission that is granted as a default to any primary device 104 seeking assistance. If primary device 104 utilizes the RAN link 110 of helper device 108 with additional link 112, the actual data traffic will travel via illustrated path 114. Further, in an example, the wireless link 112 is out-of-band link meaning that the radio technology utilized for link 112 is different from links 106 and 110.

In operation of system 100, mobile device 104 may be configured to select at least one other mobile device among many available other mobile devices based on their RAN access link conditions to the desired RAN 102 using that mobile device's RAN access link (e.g., helper 108 and its corresponding link 110). The selection may be made according to various factors and information received either from another mobile device or the RAN. In a particular aspect of how this cooperative system may function, mobile devices in the system, such as 104 and 108, may be configured to exchange RAN access link information with each other, including the data rate, channel condition, delay, and delay jitter concerning their RAN access links. A mobile device, such as primary device 104, may be configured to assess the merit of using another mobile as a helper to access the RAN 102 based on those collected RAN access link information. The merit of using a helper's RAN access link is a based on the combined factors of the out-of-band link (e.g., 112) and the helper's RAN access link (e.g., 110). Additionally, the primary device 104 may be configured to find the best helper device according to the assessment of the merits among multiple potential helper devices (and their associated RAN access links).

In another aspect, the primary device (e.g., 104) may be further configured to assess the merits of choosing to access the RAN 102 through another helper device's RAN link 110 and the direct link 112 over simply using its own RAN link 106. In this scenario, the primary device 104 is configured choose to access the RAN through the best helper's RAN access link (e.g., 110) if the merit of using a helper's RAN access link outperforms the merit of using the primary device's own direct RAN access link. Otherwise, the primary device 104 would simply use its own direct RAN access link 106 for RAN access. In a further aspect, this choice of helper devices may be made periodically or upon triggering events to ensure good utilization of cooperation.

Additionally, it is axiomatic that link 112 would be of greater capacity than the link between primary device 104 and RAN 102 for the helper cooperative arrangement to be worthwhile. Wireless link 112, which is an out-of-band link (i.e., different band or RAT from the RAN(s)) between the primary device 104 and the helper device 108, may comprise a wireless technology such as IEEE 802.11 WiFi™, as one example, but may also include any other suitable wireless technologies having efficacious data rates, capacity, and throughput.

According to yet another aspect, it is noted that the information exchanged between devices in system 100 may be transmitted and received per device (e.g., 104, 108, or nodes in network 102). This information may include the data rate, delay, and throughput per power efficiency of the radio access links (e.g., 106, 110) of both the device itself and the other device with which this device is exchanging information. Additionally, other information may include the data rate, delay, and throughput per power efficiency of the wireless link (e.g., 112) between the device and the other device with which the device is exchanging information. Further, other information that may be transmitted and received between devices or nodes in system 100 includes the radio access network and cell identifiers of the device itself and the other device with which this device is exchanging information.

It is further noted that although a single wireless link 112 is shown between devices 102 and 108, this is not limiting. The path for access of a primary device to a RAN may consist of multiple links (i.e., multiple helper devices along the path to the RAN), or parallel links (i.e., two or more helper devices operate in parallel where the primary device has multiple out-of-band wireless links to multiple helper devices each accessing the RAN directly).

Figure 2:
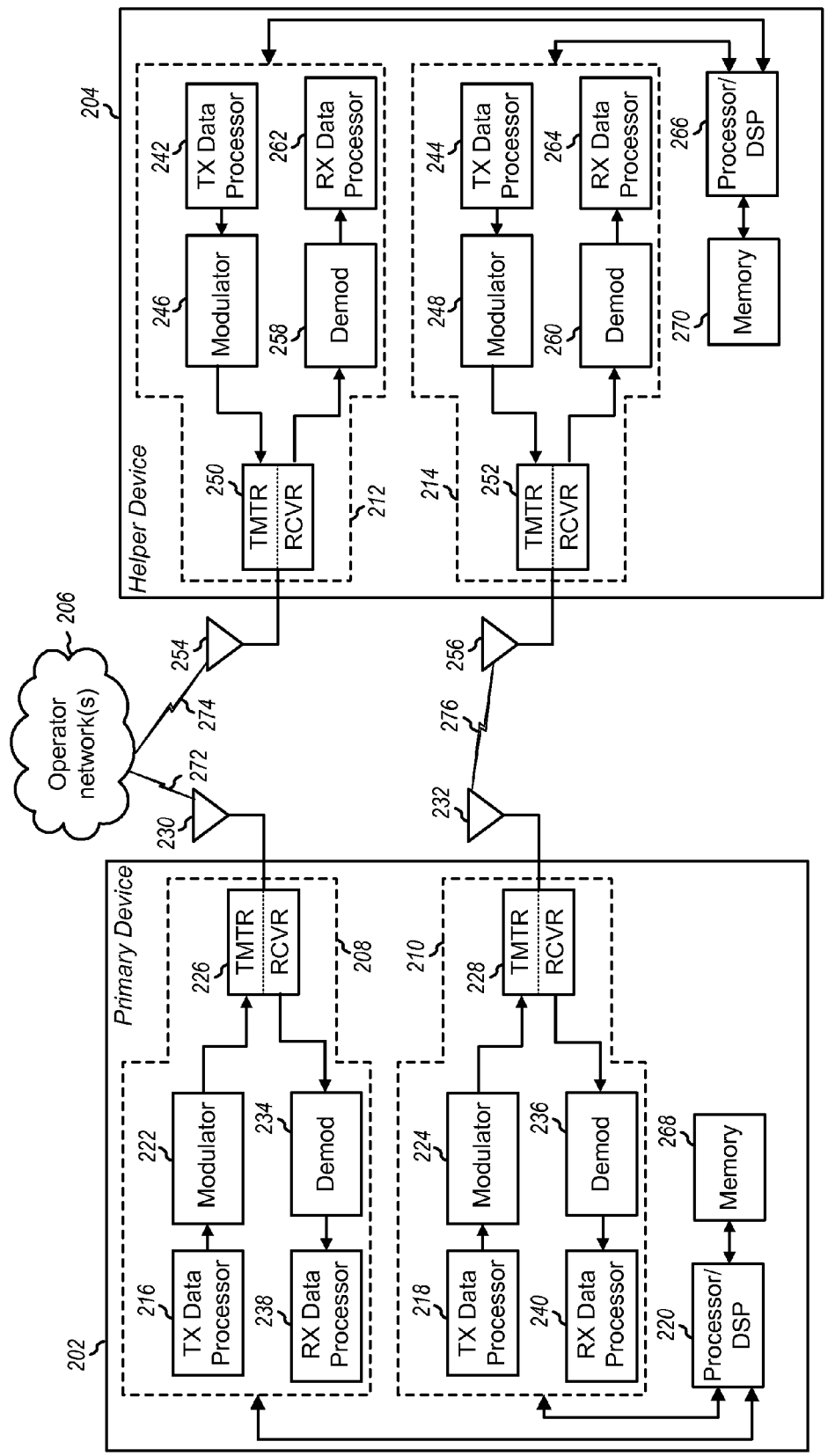
FIG. 2 illustrates an exemplary apparatus that may be used in implementing the system shown in FIG. 1.

FIG. 2 illustrates an exemplary apparatus 200 that may be used in implementing the system 100 shown in FIG. 1. The apparatus includes a primary device 202 and a helper device 204 that are both configured to access one or more RAN networks 206 shown representationally as a cloud. The primary device 202 may include one or more modems for transmitting and receiving wireless signals from one or more corresponding RATs. Additionally, the one or more modems may implement multiple data processing and RF chains to transmit and receive data via different RATs. Devices 202 and 204 are illustrated with two processing and RF chains 208 and 210 or 212 and 214 for purposes of illustrating two distinct RATs for effecting the RAN access link and the out-of-band link. It is noted, however, that FIG. 2 is merely exemplary for illustration, and that actual internal configurations of devices 202 and 204 that might be contemplated by those skilled in the art are varied and need not be configured as shown. For example, the architecture may be simplified such that one modem is configured with processing or modulation/demodulation to be shared among multiple RF Transmit/Receive circuits each performing their own associated baseband processing and RF conversions for transmission and reception. For purposes of the example of FIG. 2, it is assumed that processing and RF chains 208 and 212 are operable for wireless communication with at least one RAN, such as network 206. Processing and RF chains 210 and 214, on the other hand, are operable for effecting wireless communication between the devices 202 and 204 over an out-of-band link, such as an 802.11 link, as one example.

As illustrated, primary device 202 may include within each processing and RF chain 208, 210, a transmit data processor 216, 218 for receiving input data, as well as control information and other information, for transmission and processing through various functions, such as encoding or encrypting the data, interleaving, or interlacing. The sources of the input data and control information may be one or more of a number devices (not shown) within device 202, such as application processors (not shown), as well as digital signal processors such processor 220. The data may include not only data to be transmitted, but also control information including the information discussed before concerning the implementation of helper device selection.

Additionally, data and information from the TX processors 216, 218 is modulated by respective modulators 222, 224, and delivered to RF transmit/receive circuits 226, 228 for wireless transmission of data via respective one or more antennas 230, 232. As illustrated, transmissions from transmitter/receiver 226 are to the RAN 206, whereas transmissions from transmitter/receiver 228 are to another node or device, such as helper device 204.

The transmitter/receivers 226, 228 also receive wireless transmissions respectively from the RAN 206 or another node or device (e.g., 204). The received transmissions are demodulated by demodulators 234, 236 and then processed (e.g., decoded, etc.) by receive data processors 238, 240 for use by the DSP 220 or other processors (not shown).

It is noted that helper device 204 has a similar configuration to primary device 202 as either device could be configured to be a helper or primary device. Thus, the processing and RF chains 212, 214 include complementary transmit data processors 242, 244, modulators 246, 248, transmit/receive RF circuits 250, 252 with respective antennas 254, 256, transmit/receiver circuits 250, demodulators 258, 260, and receive data processors 262, 264. Furthermore, device 204 includes at least one processor 266, such as a DSP as one example. Each of the processors 220, 266 may also have an associated memory device 268, 270 that is configured to store computer-readable instructions or code accessible and executable by the processors 220, 266.

Additionally, as mentioned before, there may be multiple parallel transmit/receive chains 208, 210, 212, 214 used for respective RATs utilized by devices 202, 204, or combined processing that provides data to multiple transmit/receive circuits (e.g., 226, 228) that operate according to respective RATs. It is also noted that the present apparatus and methods may be applied in devices operable with one or more RATs such as LTE, LTE Advanced, 3GPP based systems, GSM, UMTS, HSPA, CDMA, 1xEVDO, W-CDMA, other 3G and 4G technologies, IEEE 802.11 WiFi, WiFi direct, WPAN (IEEE 802.15), WiMax (IEEE 802.16), WiGig, MBWA (IEEE 802.20), cognitive radio (IEEE 802.22), Bluetooth®, or various other mesh network systems such as IEEE 802.11s, as merely a few examples.

In operation, when the quality of the wireless link 272 between the primary device 202 and the RAN 206 is poor, device 202 may determine and select a helper device (e.g., 204) with a better wireless link (e.g., 274) to the RAN 206 to assist in increasing throughput and capacity as discussed in connection with FIG. 1. This is accomplished by the further utilization of an out-of-band link 276 between the two devices 202 and 204. In an example, the data path for the primary device 202 to access the RAN 206 during a helping session would be via modem or processing and RF chain 210 over out-band-link 276 to modem or processing and RF chain 214. The processor 266 may then direct that data for primary device 202 is transmitted and received via modem or processing and RF chain 212 via an "in-band" link 274 having superior quality to link 272 to access the RAN 206. Data received from the RAN 206 at helper device 204 for primary device 202 is then routed via 214 and out-of-band link 276 to primary device 202.

Figures 3, 4:
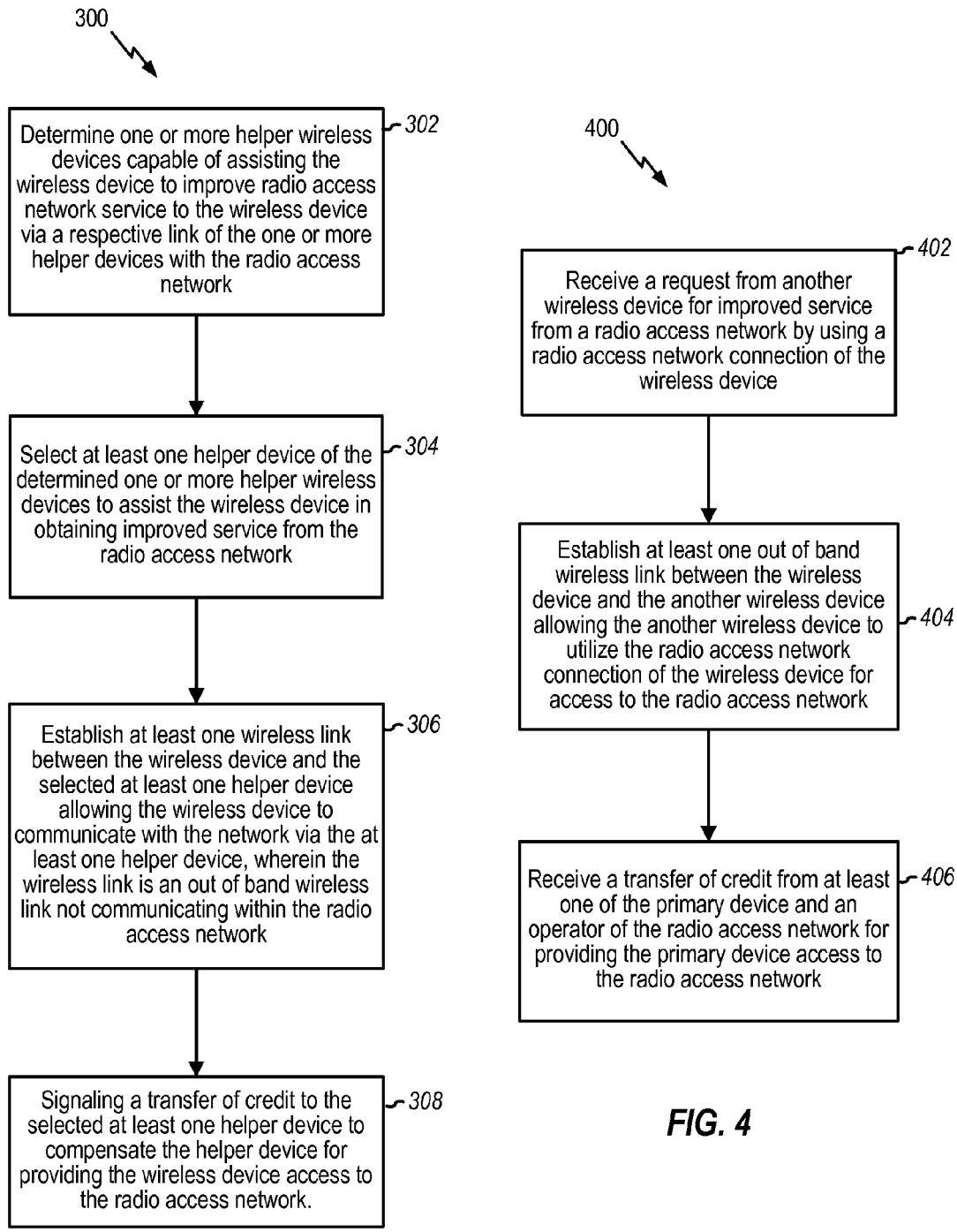
FIG. 3 is a flow diagram illustrating an exemplary method that may be implemented by a primary device to effect a helping session with at least one other helper device.
FIG. 4 is a flow diagram illustrating an exemplary method that may be implemented by a helper device to effect a helping session with at least one other helper device.

FIG. 3 is a flow diagram illustrating an exemplary method 300 that may be implemented by a primary device (e.g., 104 or 202) to effect a helping session with at least one other helper device (e.g., 108 or 204). Method 300 includes first determining one or more helper wireless devices capable of assisting the wireless device to improve radio access network service to the wireless device via a respective link of the one or more helper devices with the radio access network as shown in block 302. This discovery process of block 302 may further include receiving information such as the data rate, delay, and throughput per power efficiency of the radio access links of the one or more helper wireless devices' RAN links. Additionally, the process of block 302 may include determination based on exchanged information concerning the data rate, delay, and throughput per power efficiency of an out-of band wireless link between the device (primary device) and the one or more helper devices.

After the determination in block 302, flow proceeds to block 304 wherein the device selects at least one helper device of the determined one or more helper wireless devices to assist the wireless device in obtaining improved service from the radio access network via the one or more helper devices. As discussed previously, this selection process may be based on a comparison of which helper device or devices provide the best throughput or capacity, but is not necessarily limited to such. For example, additional factors may include incentives provided or costs imposed to either the primary or helper device, and thus selection may also be based on which helper selection provides the best economic outcome, as will be discussed in more detail later. Additionally, the selection may include sending a request message to the one or more helper devices for cooperation, and receipt of acknowledgement replies for those helper devices available to help prior to starting a cooperative helping session.

Method 300 further includes the establishing of at least one wireless link between the wireless device and the selected at least one helper device allowing the wireless device to communicate with the radio access network via the at least one helper device as indicated in block 306, wherein the wireless link is an out of band wireless link not communicating within the radio access network (e.g., wireless link 112 in FIG. 1 or 276 in FIG. 2). In this manner, the primary device may utilize another wireless link and RAT to communicate with the at least one helper such that RAN resources are not used for the communication there between.

Further, method 300 may also include a further alternative process of directing or engendering credit transfer as a means for incentivizing a user of the selected helper device. This credit transfer, which will be discussed more fully later, allows a helper device to be compensated for allowing the primary device to use its RAN link resources. In particular, method 300 may include signaling or directing Signaling a transfer of credit to the selected at least one helper device to compensate the helper device for providing the wireless device access to the radio access network as illustrated in block 308. The process in block 308 may entail the primary device directing, initiating, and/or signaling the transfer of credit from an account associated with the primary wireless device to the selected at least one helper device or a transfer of injected credit from at least one operator to the selected at least one helper device, or both. In an aspect, the operator may solely perform the credit transfers, where the operator transfers credit from the primary device's account to the helper device's account. Furthermore, in an alternative, the primary device may not actively cause the credit transfer to occur. Rather, the operator may detect cooperative helping sessions, and then determine and initiate credit transfer to the helper device, including both transfers from the primary device's account and incentivizing credit from the operator.

According to one example, the processes of method 300 may executed by primary devices 104 or 202. More specifically, method 300 may be implemented by a processor within the primary device, such as processor 220 or similar device directing the operation of the cooperative helping session, as well as processing and RF chains (e.g., 210) that carry out the particular transmission and reception of data and information with the helpers (e.g., 204) over the out of band link (e.g., 276).

FIG. 4 is a flow diagram illustrating an exemplary method 400 that may be implemented in a helper device (e.g., 108 or 204) to effect a helping session to help a primary device (e.g., 104 or 204). Method 400 starts with receiving a request from another wireless device for improved service from a radio access network by using a radio access network connection of the wireless device as shown in block 402. This request may be from a primary device seeking improved service, but is not necessarily limited to such. For example, the request could also be a relayed request from a primary device that has been relayed from another helper device that may or may not be assisting by allowing use of its RAN access link.

In response to the request in block 402, the process in block 404 provides that a helper device may then establish at least one out of band wireless link between the wireless device and the another wireless device allowing the another wireless device to utilize the radio access network connection of the wireless device for access to the radio access network. Process 404 may include establishing a direct out of band wireless link from the helping device to a primary device, such as illustrated by links 112 and 276. Nonetheless, process 404 may also encompass a situation where one helper device is relaying data and information to another helper device in a concatenated fashion as part of a relay or mesh providing RAN access to a primary device.

Further, method 400 includes receiving a transfer of credit from at least one of the primary device and an operator of the radio access network for providing the primary device access to the radio access network as illustrated by block 406. As will be discussed in more detail later, the transferred credit may include funds from a primary user's account to the helper's account to compensate for the cooperative helping session or an injection of funds from an operator to the account of the helping device to incentivize or motivate further cooperative behavior, or both. It is noted the process of block 406 may be effected by processor 266 or similar device, or alternatively through the use of an application or application programming interface in the helper device to receive or at least indicate receipt of micropayment transfers of credit from the operator of the RAN to the account of the helper device and/or payments from the user of the primary device via the RAN operator(s) for the cooperative session.

According to one example, the processes of method 400 may executed by helper devices 108 or 204. More specifically, method 400 may be implemented by a processor within the primary device, such as processor 266 or similar device directing the operation of the cooperative helping session, as well as processing and RF chains (e.g., 212, 214) that carry out the particular transmission and reception of data and information with the primary device (e.g., 104, 202) over the out of band link (e.g., 276), as well as communication with the RAN over an in-band link (e.g., 274).

Incentive System

In another aspect, an incentive system may be implemented in conjunction with the systems of either FIG. 1 or FIG. 2, such that a RAN operator has incentives to support the disclosed cooperative arrangement, and also to encourage and sustain cooperative behavior of users of helper devices and engender economic viability of cooperative arrangements. First, as mentioned above, both operators and users benefit in that the effective cell capacity for a particular cell of the RAN is increased with the arrangements of FIGS. 1 and 2, as well as increasing individual users' throughput. Notwithstanding this benefit, the present disclosure provides apparatus and methods to provide a further incentive system that may involve the RAN provider, wherein a mechanism is provided to allow an operator to incentivize cooperation with credit of monies or minutes, or other pecuniary incentives (hereinafter referred to simply as "credit").

The presently disclosed incentive system functions to provide one or more of flow of credit between the operator and helper devices, a primary device and the operator, and primary and helper devices to incentivize cooperative behavior. The incentive system includes at least two features.

A first feature is that a primary device or an operator (or both) may provide a certain amount of credit to a helper device as compensation for usage of the helper's RAN link. In the case of the primary device, for example, this credit may be based on a helping cost perceived by the helping device (or user of the helping device). In another example, the RAN operator may provide a certain amount of credit to a helper based on the extra revenue harvested by the operator due to cooperative sessions (i.e., for the extra revenue paid by the primary device for the increased throughput service).

In a particular example of how to implement this first feature, the incentive system may include at least two fund/ credit flows. One credit flow is a credit (e.g., money funds) transferred from a primary device to its helper device to compensate the helper's energy cost to operate on the RAN link and the out-of-band link. The other credit flow may be another credit type (e.g., minutes) transfer from the RAN operator to the cooperative session's helper device. This second transfer could serve to assist the helper device to potentially pay for a future cooperation as a helper device as a further incentive, or simply for extra minutes for the user of the helper device.

According to one example, the credit transfer from the operator to the cooperative session's helper device may be configured such that the amount of fund/credit transfer is less than the extra revenue the operator obtains through the cooperative session to provide incentive for the operator to offer these sessions. Additionally, the fund/credit transfer may also be configured such that the amount of the transfer is larger than an "opportunity cost," which will be more fully defined and discussed later.

A second feature of the present incentive scheme may also include a credit unification mechanism to unify or normalize the merit of energy consumption perceived by mobile devices and the merit of air resources perceived by the operator. In particular, it is noted that although the amount of time utilized by the helper mobile device in assisting could be used for determining the merit for compensation/credit, another way to judge merit is based on energy consumption. Thus, in one embodiment, the amount of fund/credit transfer may be based on sufficiently compensating a helper device for the additional energy spent at the helper. In an aspect, the unit of the credit may be normalized to the energy unit of joules, but is not limited to solely this particular unit of energy. Thus, the credit may be calculated to be the number of joules that the helper device expends in participating in a cooperative session. In one exemplary embodiment, the credit could be calculated to be the amount of joules the helper device spends to utilize the extra airtime harvested by the operator due to the cooperation. That is, since a primary device is requesting and using additional data resources in a cell of the RAN, the operator will charge for this upgraded service.

In an aspect, it is contemplated that either the primary device could be configured to compensate the helper directly or the primary device could trigger the particular RAN operator to provide the credit (which could therein debit the primary device user's account, for example). By tying the costs to an energy unit in this second feature, the present scheme provides for normalization and unification of the unit basis between the cost to help expended by the helper device and the benefits to operator of the overall capacity increase.

Furthermore, it may be advantageous to have the operator's involvement in the incentive system for to ensure success in varied situations. If the channel conditions of mobile devices vary with sufficient diversity due to mobility, the credit transfer among cooperative devices would be sufficient to sustain cooperation behaviors, since a device that cooperates can always finds other suitable devices to help when its channel is in poor condition. However, when some devices consistently experience poorer channel conditions, and other devices consistently experience good channel conditions, there will not be enough incentives to continue cooperation, because good conditioned mobiles cannot get reciprocal help. Hence, if an operator interjects to fund those helpers who could not get reciprocal help due to their consistently good channel conditions.

Figure 5:
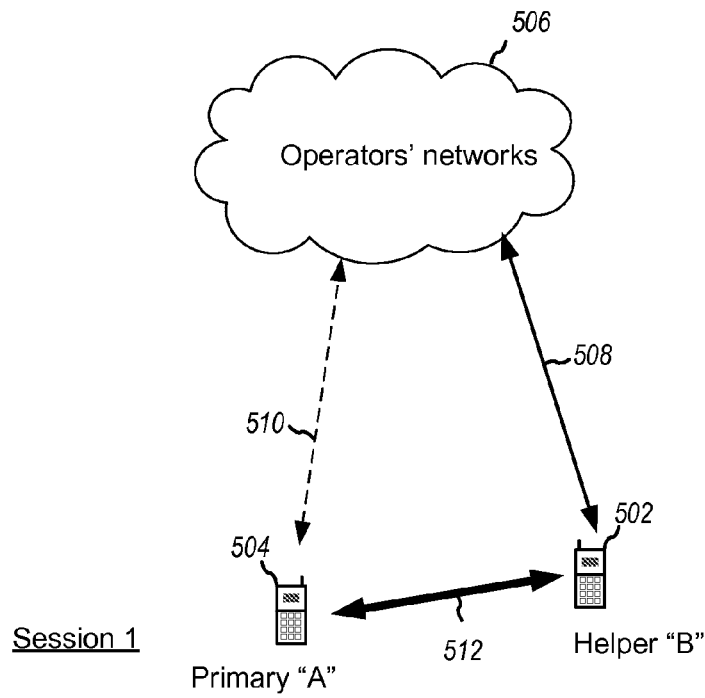
FIG. 5 is a diagram illustrating a first helping session using primary and helping devices.
Figure 6:
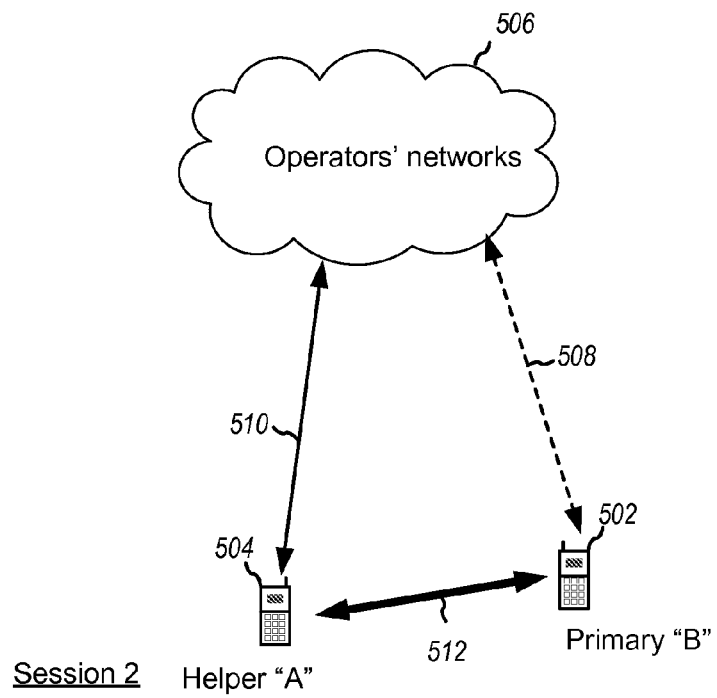
FIG. 6 is a diagram illustrating a second helping session using primary and helping devices.

Accordingly, another consideration in the present incentive scheme is opportunity cost, as briefly mentioned before. The opportunity cost is defined as the gap or difference between the amount of credit that a helper mobile device obtains in a previous cooperation session and the amount of credit that the helper device has to pay to get help in a primary device role from another mobile device (acting as helper) in a subsequent helping session. As an illustration, FIGS. 5 and 6 show two helping sessions that demonstrate the concept of opportunity cost. In the situation shown in FIG. 5, it is assumed that mobile device 502 is a very good conditioned mobile device acting as a helper device that helps a poorly conditioned mobile device 504 to access a RAN 506 via its RAN access link 508. As mobile device 502 has a very good link 508, the user of device 502 may receive only a small amount of fund/ credit transfer due to the small cost to mobile device 502 for providing help to mobile device 504. For purposes of this illustration, it is assumed that the cost to pay for the helping session 1 in the scenario of FIG. 5 is a value "C1."

In a second scenario shown in FIG. 6, when mobile device 502 is in a poor condition for access to RAN 506, it may request cooperation from mobile device 504 in a subsequent helping session. If the condition of RAN access link 510 of mobile device 504 is inferior to the RAN access link 508 from the past session, however, the credit that mobile device 502 obtained in the previous session (e.g., C1 in the scenario in FIG. 5) may be insufficient to pay for the current cooperation helping session 2, as the difference in the RAN access link conditions between these two mobiles may be less than that in the previous session. It is assumed that higher cost for the session of FIG. 6 is "C2", which is greater than C1. The opportunity cost is the difference of C1 and C2 (.e.g., C2-C1). Thus, in this situation, since there is an incurred opportunity cost, not a gain, to device 502 this will give rise to disincentive for the user of mobile device 502 to offer further cooperation in the helping session as there is a net cost, not gain. When opportunity cost is considered, it becomes evident that in order to ensure that such situations do not disincentive, an operator (or other party) could inject credits for incentive, such as to the user of device 502 in the example of FIGS. 5 and 6.

According to an aspect, a quantitative or mathematical measure may be established such that revenue that the operator harvests in a cooperative session is sufficient to inject credit or funds to a helper device for one subsequent cooperative session when two mobile devices switch their channel condition insufficiently. According to an aspect, one scheme to govern the injection of credit to ensure viability of the cooperative system that is contemplated may include allowing a helper device to set a particular profit margin that is desired from offering the cooperative assistance to a primary device, this profit margin denoted herein with a variable $\alpha$. Additionally, a portion of the extra revenue harvested by the operator arising from the first cooperation session as exemplified in FIG. 5 (i.e., the revenue from mobile 504 since the operator may charge more for the increased service) could be used to fund credits provided to the helper (i.e., mobile device 502 in session 1) by the operator. A variable γ can be used to denote the percentage of the revenue that the operator needs to inject as credits/funds to the helper. The credit incentive scheme then may be configured such that γ≥(1+α). Stated another way, the percentage of revenue credited by the operator back to mobile helper 502 is equal to or exceeds the profit or profit margin the helper desires given a net energy expenditure over multiple cooperative sessions. However, it is axiomatic that if the profit margin demanded by helper devices for their cooperation is too high, then the costs become too great and the scheme becomes unworkable and unprofitable for an operator.

In a specific quantitative example, the credit or fund transfer from primary device 504 (also denoted here as primary device A) in FIG. 5 to helper device 502 (also denoted here as helper device B), can be defined fund transfer function $f_{AB}$ for funds from device A to device B where $f_{AB} = (1+\alpha)(e_{OOB} + e_{C1})$, and where $e_{OOB}$ denotes the energy in joules spent on the out-of-band link 512 by the helper B, $e_{C1}$ denotes the energy in joules spent on the cell link by the helper device B in the 1st cooperative session (FIG. 5), and α denotes a possible profit margin for the helper desired for offering cooperation. Stated another way, the fund transfer is determined based on the total energy cost of both links (in-band and out of band) normalized in terms of energy units multiplied by the desired profit margin or markup.

In order to keep the cooperative system economically viable, the helper device B (i.e., device 502 in the example of FIGS. 5 and 6) would, in one example, have a constraint to keep the profit margin a equal to or below a certain threshold as determined by the following equation: $\alpha \leq (e_{poor} - e_{C2})/(e_{C2} - e_{C1})$, where $e_{poor}$ denotes the energy that would be spent if the cooperation did not occur; $e_{C1}$ denotes the energy spent on the cell link by the helper B in the 1st cooperation session of FIG. 5; and $e_{C2}$ denotes the energy spent on the RAN access link by the helper in the 2nd cooperation session.

According to another aspect, fund or credit transfer from the RAN operator to a helper device B (e.g., mobile device 502 in FIG. 5) may be determined according to a fund transfer function $f_{OB}$, where $f_{OB} = *\gamma(e_{poor} - e_{C1})$, and where $(e_{poor} - e_{C1})$ is the extra revenue harvested by the operator from the first cooperative session in terms of normalized units of energy (e.g., joules); and γ denotes the percentage of that revenue that the operator injects as funds or credits to the helper device for incentive. In an aspect, an optimal credit percentage γ the operator would need to inject to the helper may be governed by the relationship $\gamma \geq (1+\alpha)[(e_{C2} - e_{C1})/(e_{poor} - e_{C1})]$ to ensure viability for cooperative behavior for at least one subsequent session.

In another aspect, if an operator desires to fund up to K subsequent cooperative sessions where K≥2, when the sessions have identical cooperation setups where two mobile devices switch their channel condition insufficiently, the operator may quantitatively establish the following relationship: $\gamma \geq [(1+\alpha)/(e_{poor} - e_{c1})][(e_{c2} - e_{c1}) + (K-1)(e_{OOB} e_{c2})]$. In order to prevent users of primary devices from taking advantage of the available incentive percentage or credit in such a situation, but refusing to offer their device as a helping device (also referred to herein as "free riders"), the operator may set the following constraints or quantitative measure: $[(1+\alpha)/(e_{poor} - e_{c1})][(e_{c2} - e_{c1}) + (K_{min} - 1)(e_{OOB} + e_{c2})] \leq \gamma \leq [(1+\alpha)/(e_{poor} - e_{c1})][(e_{c2} - e_{c1}) + (K_{max} - 1)(e_{OOB} + e_{c2})]$, where $K_{min}$ and $K_{max}$ are respectively the minimum and the maximum number of cooperative sessions the operator may intend to fund that have identical cooperation setups where two mobile devices switch their channel condition insufficiently. It may be inferred from this relationship, qualitatively speaking, that the percentage of the extra revenue that the operator transfers to the helper device (e.g., 502) may be limited between a predetermined maximum of injection of credit transfer that is capped to prevent users from taking unfair advantage of incentive credits (i.e., limit free riders), but that is also set equal to or above a predetermined minimum to ensure that the helper device will receive incentive credit for situations wherein a user of the helper device does not have good or other incentive for assisting in a helping session.

In another alternative, it is contemplated that a RAN operator may charge a primary device to boost its data rate by providing an Application Programming Interface (API) or similar application to a mobile device or phone for enabling or signaling micropayment transactions (i.e., payment transactions involving small sums of money or amounts of credits). These types of transactions may be used by the RAN operator to charge a user account associated with a primary device an extra fee to boost the user's data rate with consent. The data rate boost is at the expense of other users' data rate, since the characteristics of all active channels in the network are not changed upon this operation. In other words, the extra revenue the operator obtains by charging extra fees for boosting certain users would not be granted if not for the fact that other users are not asking for compensation for their data rate drop.

Furthermore, the API could be used by the operator to effect the transfers discussed above, including transfers from the primary to the helper and transfers from at least one operator to the helper. The transaction may include covering the basic cost at the helper device to help with the session. The transaction (or a separate transaction), may also credit an incentive fund that rewards the helper device, such as extra minutes or some pecuniary reward.

It is noted that in the present system, when a helper device helps a primary device to access the RAN, the operator does not need to divert or take away bandwidth from other users. The operator may simply replace the primary device's cell link by the helper's cell link for a rate increase. Hence, after the operator charges the primary device an extra fee for a better data rate, and the operator would also inject a particular percentage or portion of its extra revenue into the helper's account as discussed above. In another aspect, the alternative incentivized cooperation system may further include an operator charging a primary device to boost its data rate using the micropayment transaction API. Instead of taking away other users' bandwidth, the operator uses a helper device's cell or RAN link to deliver the primary device's data. This may require the primary device to provide a helper list to the operator of those helpers having a better channel, as well as the ability to communicate with the primary device both in-band or out-of-band.

Additionally, in the alternative system the operator may inject a fund or credit into the helper's account. The operator may also utilize the micropayment transaction API to perform this task with the helper. The fund may be configured to cover at least two different portions of a helper session. First, the fund may help cover the basic cost at the helper device to help the session. Additionally, the fund may be used for an incentive fund that rewards the helper device. In summary, this alternative incentivized cooperation system allows the operator to boost the data rate of certain users without taking away other devices' bandwidth and incentivize users to cooperate among each other so to sustain this mechanism.

Further, it is noted that although it is known in peer-to-peer systems to configure peer nodes to cooperate among one another, such systems are distinct from the present disclosure. In particular, the known peer-to-peer systems cooperate among peer nodes primarily for storing contents more efficiently in a distributed manner, collaboratively sending data to enhance the throughput, sharing processing tasks to reduce the workload, or collaboratively transmitting signals to obtain the capacity gain in a multipath physical channel. Different from the above objectives and schemes of peer-to-peer systems, the present incentivized cooperative system enables cooperation among peer mobile devices to access a RAN so to increase the cell capacity as well as individual RAN access throughput, which is not present or of concern in peer-to-peer systems.

Figure 7:
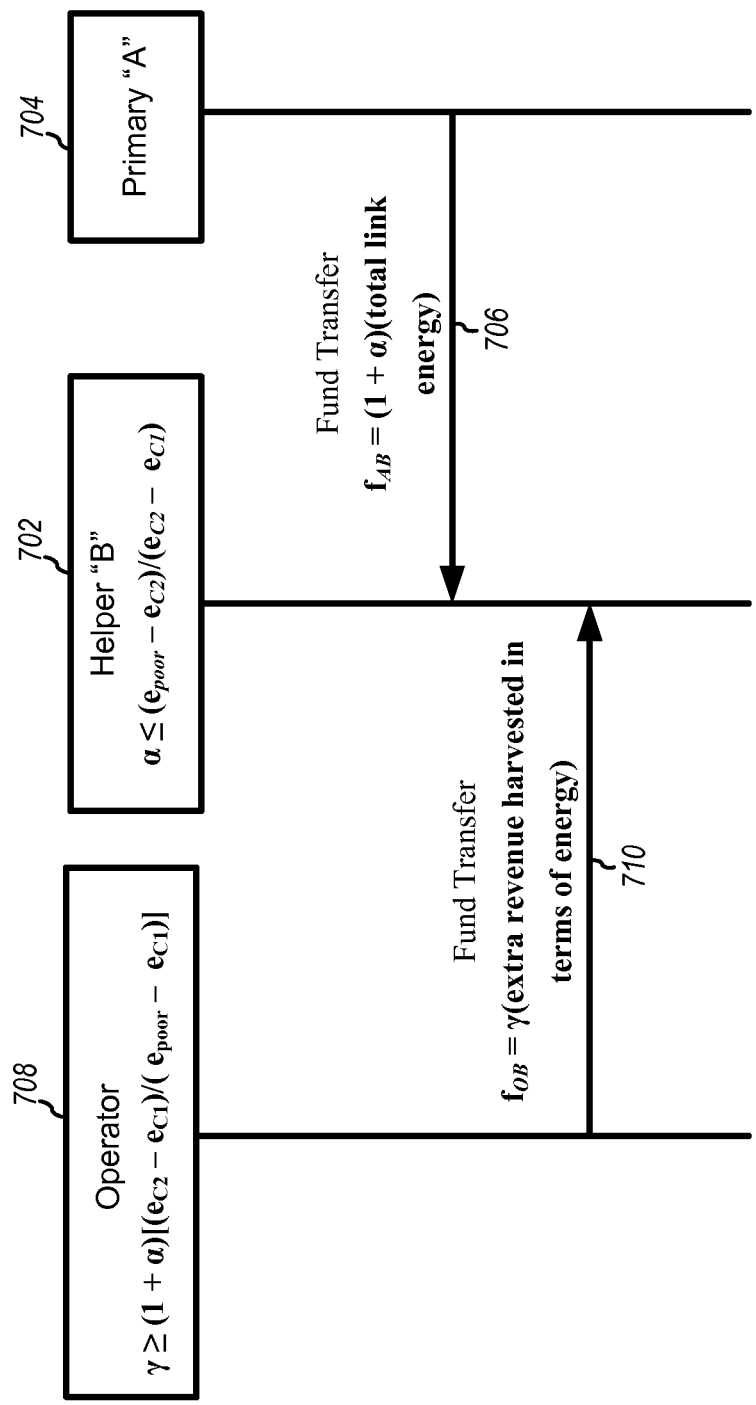
FIG. 7 is a diagram illustrating credit transfers between devices and an operator according to the present disclosure.

FIG. 7 is a diagram illustrating credit transfers between devices and an operator according to the presently disclosed incentive scheme. As illustrated, a helper device 702 (Helper "B") or an account associated therewith receives credit or funds from one or more of a primary device 704 (Primary "A") or accounts associated therewith and a RAN operator and associated equipment 708 or accounts associated therewith. As discussed before, a profit margin a for helper device 702 may be defined by the relationship $\alpha \leq (e_{poor} - e_{C2})/(e_{C2} - e_{C1})$, and the percentage of the revenue that the operator needs to inject as credits/funds to the helper $\gamma$ may be defined by the relationship $\gamma \geq (1+\alpha)[(e_{C2}-e_{C1})/(e_{poor}-e_{C1})]$. After one or more helping sessions, the primary device 704 may be configured to perform (or cause another device or the operator to perform) a fund transfer 706 to the helper device 702. In an aspect, the amount of funds or credits transferred is governed by the function $f_{AB}=(1+\alpha)$(total link energy), where the total link energy is the energy expended for both the in-band and out of band links used in the helping session.

Additionally, based on one or more helping sessions involving helper "B" 702, the operator 708 may initiate a fund or credit transfer 710 to the helper device 702 to incentivize the user of the helper device 702 toward future cooperative behavior. The amount of funds or credits transferred may be based on the function $f_{OB}=\gamma^*$ extra revenue harvested in terms of energy units (e.g., joules). As also discussed before, the underlying relationship governing fund or credit transfer may be $\gamma \geq (1+\alpha)$ to provide incentive or profitability to the operator 708 to continue offering cooperative arrangements.

According to another aspect, an operator such as operator 708, may infer or determine channel condition information at geographic locations based on collected historical information of credit transfers to or from mobile users in relation to their location, which indicates the frequency of collaborative behavior occurring in a particular location. In an aspect, this information may be derived from the credit decrease information of mobile users. For example, if the credits of mobile users often decrease at a certain geographic location, which indicates use of helpers by those mobile users, this may also indicate that the channel conditions are generally poor in that area. In such case, the operator may deploy solutions based on the synthesized channel condition information. It is noted that this retrieval of information is different from conventional methods of retrieving physical layer information, as the information can be obtained at the application layer based on credit transfers.

Figure 8:
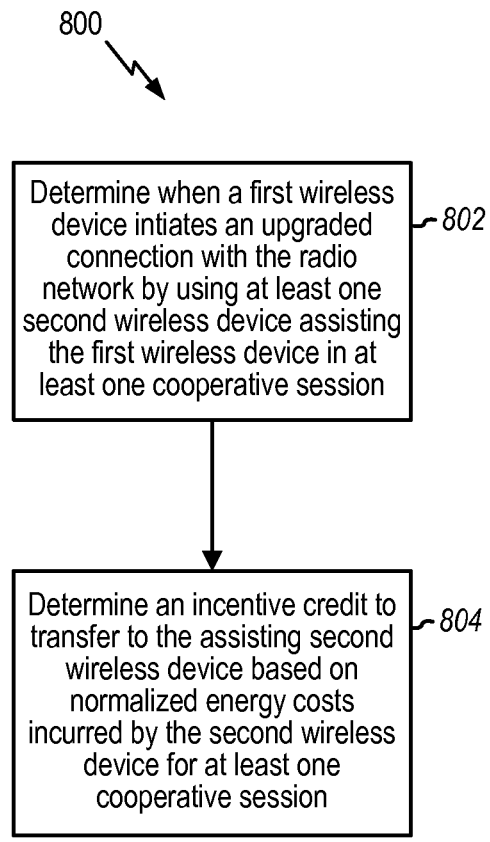
FIG. 8 is a flow diagram illustrating an exemplary method that may be implemented by an operator to effect a helping session between a primary device at least one helper device.

Moreover, the operator may infer cooperative behavior information from the credit change information of mobile user. From this information, mobile users' behaviors may then be classified into various cooperation patterns and classifications, such as "highly cooperative", "cooperative", "altruistic", "less cooperative", "non-cooperative", and so forth. Users that are highly cooperative may then be dynamically selected by service providers or operators to be mobile content providers for traffic offloading. Additionally, information concerning the cooperative behavior patterns about particular users may be transmitted to other devices to assist in the selection process FIG. 8 illustrates a flow diagram of an exemplary method 800 that may be executed by a RAN operator and RAN equipment to implement an incentivized cooperative helping session to provide upgraded service to a device from the RAN, such as a primary device. As illustrated, the method 800 includes first determining when a first wireless device is requesting an upgraded connection with the radio access network by using a second wireless device (e.g., a helper device) assisting the first wireless device with RAN access as illustrated by block 802. In block 804, the operator may then be configured to determine an optimal incentive credit to transfer to the assisting second wireless device based on normalized energy costs incurred by at least the second wireless device for at least one cooperative session where the second wireless device assists the first wireless device. It is noted that, in an aspect, the optimal incentive credit in block 804 may be determined by a predetermined percentage $\gamma$ of the extra revenue harvested by RAN operator for the provide upgraded service in terms of normalized energy (e.g., $e_{poor}-e_{C1}$), where the energy e is in terms of joules).

Figure 9:
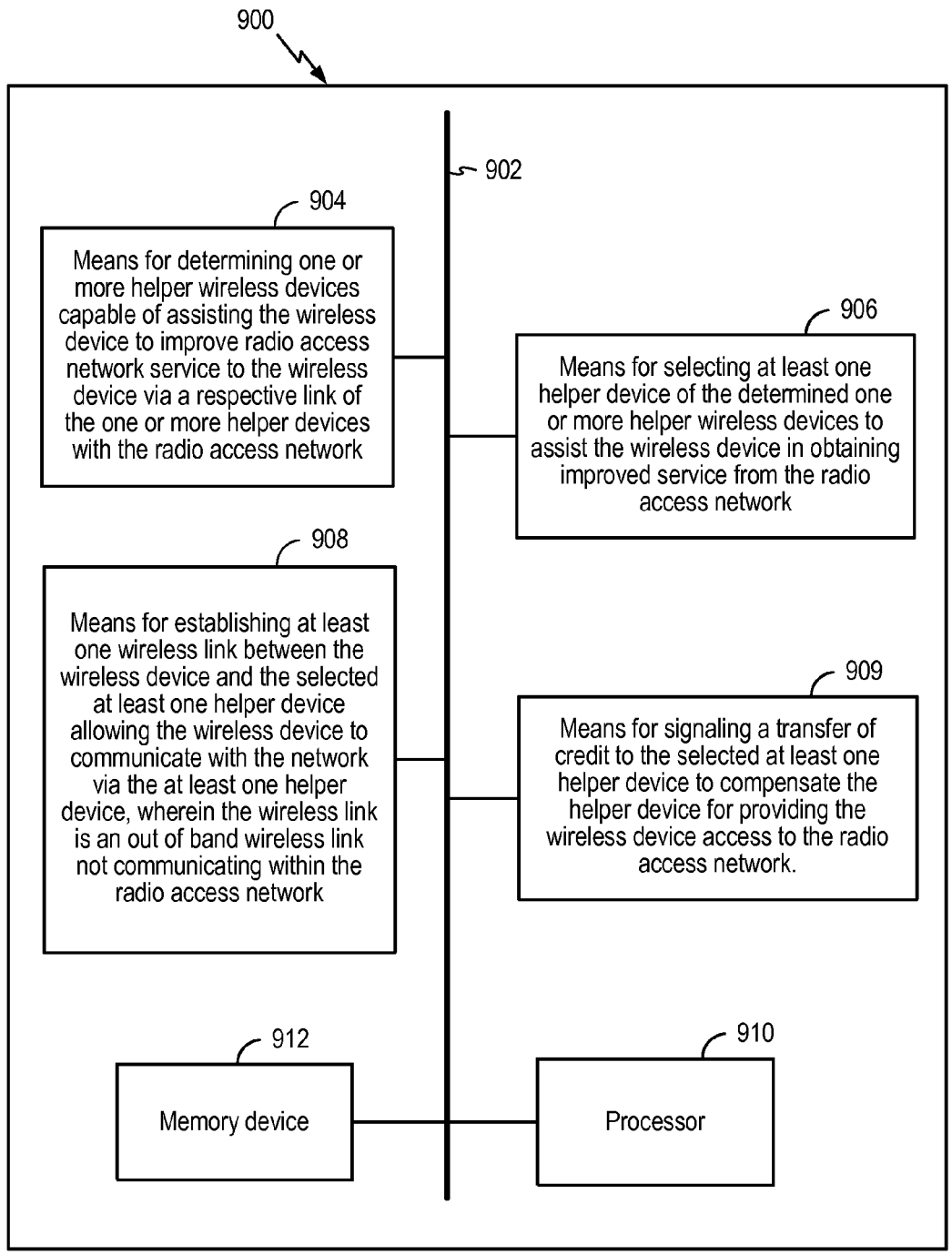
FIG. 9 illustrates an exemplary apparatus operable for employing the presently disclosed methods for implementing an exemplary cooperative system for assisting with access to a RAN.

FIG. 9 illustrates another exemplary apparatus 900 operable for employing the presently disclosed methods for implementing an exemplary cooperative system for assisting with access to a RAN. Apparatus 900 is operable within a wireless device, such as devices 104, 108, 202, or 204, or within portions thereof. It is first noted that apparatus 900 is illustrated with a communication bus 902 merely to indicate that the various means, blocks, modules, or circuitry within apparatus 900 are communicatively coupled and that communication of data and information occurs there between. Apparatus 900 may include a means or module 904 for determining one or more helper wireless devices capable of assisting the wireless device to improve radio access network service to the wireless device via a respective link of the one or more helper devices with the radio access network. In an aspect, means 904 may be implemented by processor 220 in FIG. 2, for example, or any other equivalent devices or structures for carrying out the determining function. Additionally, it is noted that means 904 may configured to implement the process in block 302 of method 300.

Apparatus 900 further includes a means or module 906 for selecting at least one helper device of the determined one or more helper wireless devices to assist the wireless device in obtaining improved service from the radio access network. In an aspect, means 906 may be implemented by processor 220, or any equivalent thereof capable of performing the function. Additionally, it is noted that in an aspect means 906 is configured to implement the process in block 304 of method 300, for example.

Apparatus 900 also includes a means or module 908 for establishing at least one wireless link between the wireless device and the selected at least one helper device allowing the wireless device to communicate with the network via the at least one helper device, wherein the wireless link is an out of band wireless link not communicating within the radio access network. Means 908 may be implemented by processor 220, and processing and RF chain 210, as merely one example, but could be implemented with any equivalent thereof capable of performing the function. Additionally, in an aspect, means 908 may be configured to implement the process in block 306 of method 300.

Apparatus 900 also includes means 909 for directing, signaling, or causing signaling a transfer of credit to the selected at least one helper device to compensate the helper device for providing the wireless device access to the radio access network. In one aspect, means 909 may be implemented by processor 220 and at least one of processing and RF chains 208 and 210. Additionally, in another alternative, means 1007 may utilize an application or API that receives micropayment transfers from at least an operator of the RAN. Furthermore, means 909 may be configured to effect the processes or operation of block 308 in method 300.

In another optional aspect, apparatus 900 may include also includes a general processor 910 (or application specific processor in another aspect), which may perform any or all of the various functions of the various means of apparatus 900 in association with a memory device 912 used to store instructions executable by the processor 910 to implement one or more various functions. It is noted that any of the means in apparatus 900 may be implemented with hardware, software, firmware, or any combination thereof, and may further be implemented separately as shown, or alternatively in an integral unit such as in a processor 910 or similar device.

Figure 10:
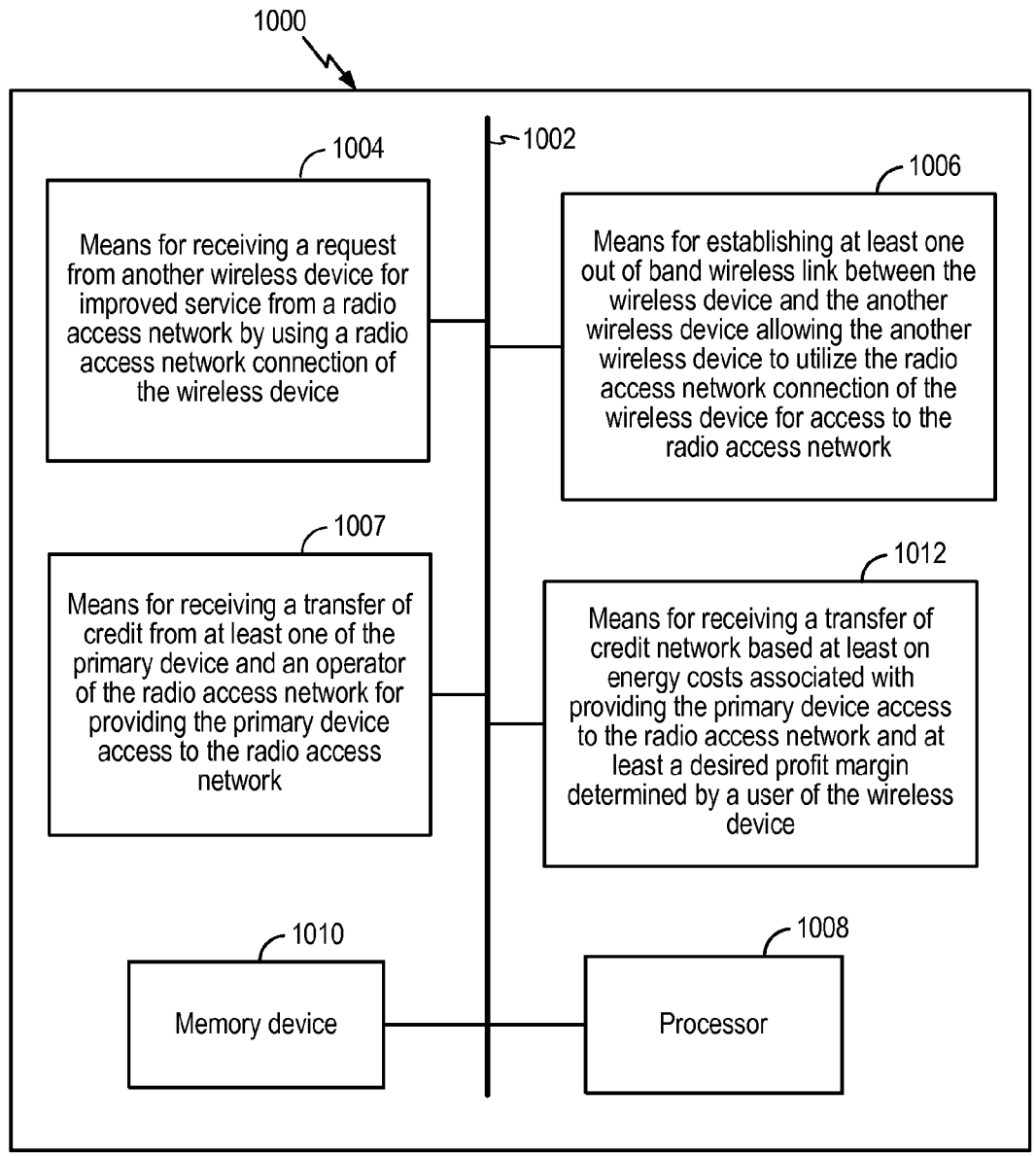
FIG. 10 illustrates another exemplary apparatus operable for employing the presently disclosed methods for implementing an exemplary cooperative system for assisting with access to a RAN.

FIG. 10 illustrates another exemplary apparatus 1000 operable for employing the presently disclosed methods for implementing an exemplary cooperative system for assisting with access to a RAN. Apparatus 1000 is operable within a wireless device, such as devices 104, 108, 202, or 204, or within portions thereof. It is first noted that apparatus 1000 is illustrated with a communication bus 1002 merely to indicate that the various means, blocks, modules, or circuitry within apparatus 1000 are communicatively coupled and that communication of data and information occurs there between.

Apparatus 1000 may include a means or module 1004 for receiving a request from another wireless device for improved service from a radio access network by using a radio access network connection of the wireless device. In an aspect, means 1004 may be implemented by processor 266 in FIG. 2, for example, or any other equivalent devices or structures for carrying out the determining function. Additionally, it is noted that means 1004 may configured to implement the process in block 402 of method 400.

Apparatus 1000 further includes a means or module 1006 for establishing at least one out of band wireless link between the wireless device and the another wireless device allowing the another wireless device to utilize the radio access network connection of the wireless device for access to the radio access network. In an aspect, means 1006 may be implemented by processor 266, as well as processing and RF chains 212 and 214, or any equivalent thereof capable of performing the functions. Additionally, it is noted that in an aspect means 1006 is configured to implement the process in block 404 of method 400, for example.

Further, apparatus 1000 may include means 1007 for receiving a transfer of credit from at least one of the primary device and an operator of the radio access network for providing the primary device access to the radio access network. In an aspect, means 1007 may be implemented by processor 266 as one example, or any equivalent structure. Additionally, in another alternative, means 1007 may utilize an application or API that receives micropayment transfers from at least an operator of the RAN. Furthermore, means 1007 may be configured or structured to effect the operations or processes of block 406 in method 400, for example.

In another optional aspect, apparatus 1000 may include also includes a general processor 1008 (or application specific processor in another aspect), which may perform any or all of the various functions of the various means of apparatus 1000 in association with a memory device 1010 used to store instructions executable by the processor 1008 to implement one or more various functions. It is noted that any of the means in apparatus 1000 may be implemented with hardware, software, firmware, or any combination thereof, and may further be implemented separately as shown, or alternatively in an integral unit such as in a processor 1008 or similarly equivalent device.

Still further, apparatus 1000 may further include means 1012 for receiving a transfer of credit network based at least on energy costs associated with providing the primary device access to the radio access network and at least a desired profit margin determined by a user of the wireless device. This means 1012 may be implemented by a processor, such as 266 or equivalent processing devices.

Figure 11:
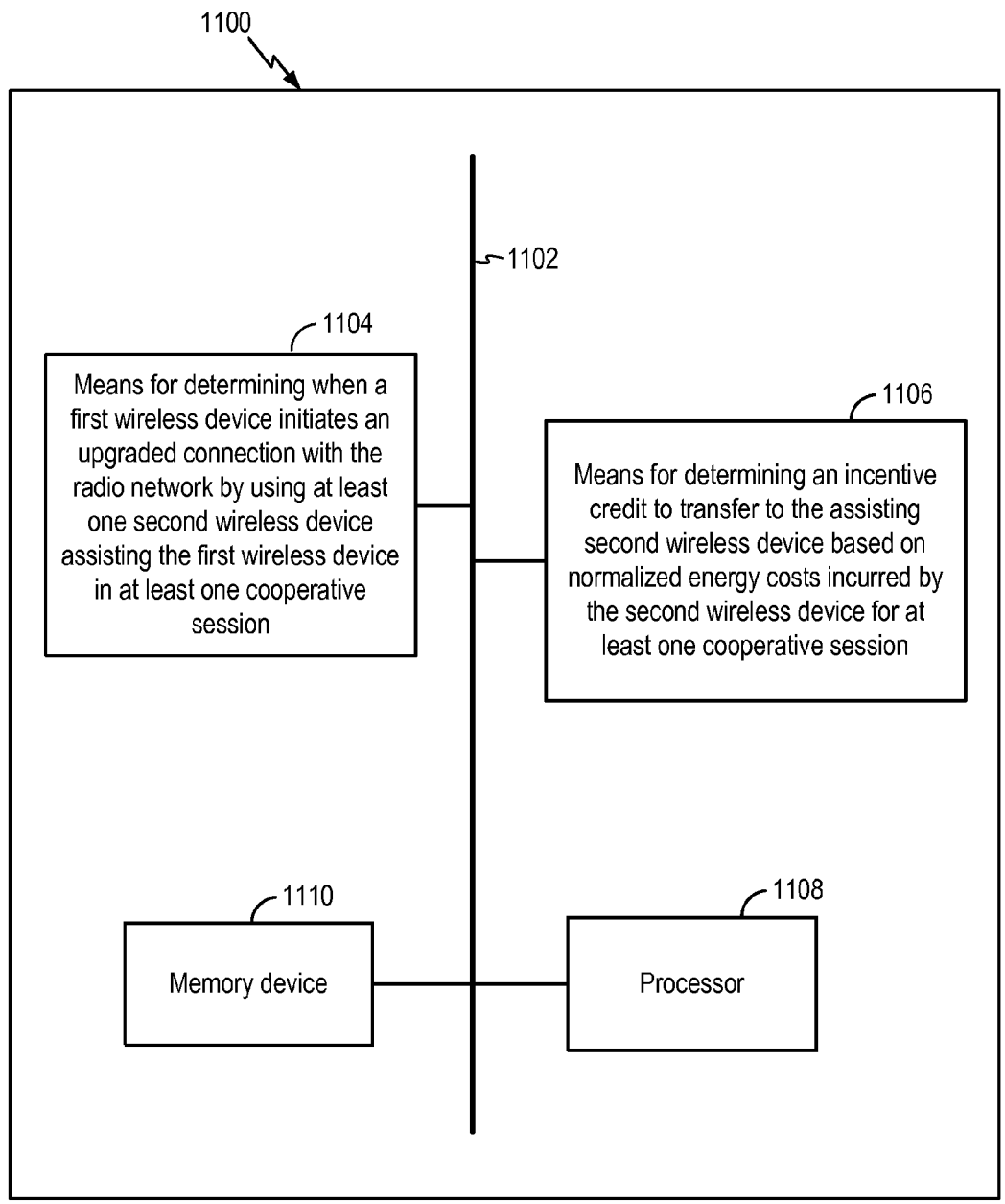
FIG. 11 illustrates yet another exemplary apparatus operable for employing the presently disclosed methods for implementing an exemplary cooperative system with incentives for assisting with access to a RAN.

FIG. 11 another exemplary apparatus 1100 operable for employing the presently disclosed methods for implementing an exemplary cooperative system with incentives for assisting with access to a RAN. Apparatus 1100 is operable within at least one operator network, such as RAN 102, 206, Operator 708, or within portions and associated equipment thereof. It is first noted that apparatus 1100 is illustrated with a communication bus 1102 merely to indicate that the various means, blocks, modules, or circuitry within apparatus 1100 are communicatively coupled and that communication of data and information occurs there between.

Apparatus 1100 may include a means or module 1004 for determining when a first wireless device is initiating an upgraded connection with the radio network by using at least one second wireless device assisting the first wireless device. In an aspect, means 1004 may be configured to receive communication from one of a primary device and helper device to determine the upgraded connection (i.e., information concerning the existence of and details of the in-band and out of band connection set up such that a primary device may utilize a helper's RAN link for upgraded or improved service with higher throughput and capacity). Additionally, it is noted that means 1004 may configured to implement the process in block 802 of method 800.

Apparatus 1100 further includes a means or module 1106 for determining an optimal incentive credit to transfer to the assisting second wireless device based on normalized energy costs incurred by the second wireless device for at least one cooperative session. In an aspect, means 1106 is configured to implement the process in block 804 of method 800, for example.

In another optional aspect, apparatus 1100 may include also includes a general processor 1108 (or application specific processor in another aspect), which may perform any or all of the various functions of the various means of apparatus 1100 in association with a memory device 1110 used to store instructions executable by the processor 1108 to implement one or more various functions. It is noted that any of the means in apparatus 1100 may be implemented with hardware, software, firmware, or any combination and equivalent thereof, and may further be implemented separately as shown, or alternatively in an integral unit such as in a processor 1108 or similarly equivalent device.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary computer program product and/or computer-readable storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous descriptions of the disclosed embodiments are provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for providing improved service to a wireless device in a radio access network, the method comprising:

determining with the wireless device one or more helper wireless devices capable of assisting the wireless device to improve radio access network service to the wireless device via a respective link of the one or more helper devices with the radio access network, wherein improvement of the radio access network service includes increasing the throughput of the wireless device which is already in existing in-band wireless communication with the radio access network;

selecting at least one helper device of the determined one or more helper wireless devices to assist the wireless device in obtaining improved service from the radio access network;

establishing a wireless link between the wireless device and the selected at least one helper device allowing the wireless device to communicate with the network via the at least one helper device, wherein the wireless link is an out of band wireless link not communicating within the radio access network; and signaling a transfer of credit to the selected at least one helper device to compensate the helper device for providing the wireless device access to the radio access networks, wherein the transfer of credit is from at least one of an account associated with the wireless device to the selected at least one helper device and from at least one operator to the selected at least one helper device.

2. The method of claim 1, wherein selecting the at least one helper device includes transmitting information to and receiving information from one or more of the plurality of helper devices in order to determine the suitability of each of the plurality to be used as a helper.

3. The method of claim 2, wherein the information transmitted and received includes at least one of:

a data rate, delay, and throughput per power efficiency of in band radio access links of at least one of wireless device and the at least one helper device;

data rate, delay, and throughput per power efficiency of the out of band wireless link between the wireless device and the at least one helper device; and radio access network and cell identifiers of at least one of the wireless device and the at least one helper device.

4. The method of claim 1, further comprising:

determining a total amount of link energy for the out of band wireless link and the radio access link energy of at the selected at least one helper device for at least one helping session; and calculating an amount of credit transferred based on the total amount of link energy and a profit margin set by the selected at least one helper device.

5. The method of claim 4, wherein the link energy is a normalized value in units of joules.

6. The method of claim 1, wherein signaling the transfer of credit includes signaling transfer through use of an application causing micropayment transfers of credit from at least one of an account associated with the wireless device and at least one operator of the radio access network to an account associated with the selected at least one helper device.

7. An apparatus for providing improved service to a wireless device in a radio access network, the apparatus comprising:

at least one processor configured to:

determine with the wireless device one or more helper wireless devices capable of assisting the wireless device to improve radio access network service to the wireless device via a respective link of the one or more helper devices with the radio access network wherein improvement of the radio access network service includes increasing the throughput of the wireless device which is already in existing in-band wireless communication with the radio access network;

select at least one helper device of the determined one or more helper wireless devices to assist the wireless device in obtaining improved service from the radio access network;

establish a wireless link between the wireless device and the selected at least one helper device allowing the wireless device to communicate with the network via the at least one helper device, wherein the wireless link is an out of band wireless link not communicating within the radio access network; and signal a transfer of credit to the selected at least one helper device to compensate the helper device for providing the wireless device access to the radio access network, wherein the transfer of credit is from at least one of an account associated with the wireless device to the selected at least one helper device and from at least one operator to the selected at least one helper device; and a memory in communication with the at least one processor.

8. The apparatus of claim 7, wherein the at least one processor is further configured to select the at least one helper device based on transmitting information to and receiving information from one or more of the plurality of helper devices in order to determine the suitability of each of the plurality to be used as a helper.

9. The apparatus of claim 8, wherein the information transmitted and received includes at least one:

a data rate, delay, and throughput per power efficiency of in band radio access links of at least one of wireless device and the at least one helper device;

data rate, delay, and throughput per power efficiency of the out of band wireless link between the wireless device and the at least one helper device; and radio access network and cell identifiers of at least one of the wireless device and the at least one helper device.

10. The apparatus of claim 7, the least one processor further configured to:

determine a total amount of link energy for the out of band wireless link and the radio access link energy of at the selected at least one helper device for at least one helping session; and calculate an amount of credit transferred based on the total amount of link energy and a profit margin set by the selected at least one helper device.

11. The apparatus of claim 10 wherein the link energy is a normalized value in units of joules.

12. The apparatus of claim 7, the least one processor further configured to:

signal the transfer of credit through use of an application causing micropayment transfers of credit from at least one of an account associated with the wireless device and at least one operator of the radio access network to an account associated with the selected at least one helper device.

13. An apparatus for providing improved service to a wireless device in a radio access network, the apparatus comprising:

means for determining with the wireless device one or more helper wireless devices capable of assisting the wireless device to improve radio access network service to the wireless device via a respective link of the one or more helper devices with the radio access network, wherein improvement of the radio access network service includes increasing the throughput of the wireless device which is already in existing in-band wireless communication with the radio access network;

means for selecting at least one helper device of the determined one or more helper wireless devices to assist the wireless device in obtaining improved service from the radio access network;

means for establishing a wireless link between the wireless device and the selected at least one helper device allowing the wireless device to communicate with the network via the at least one helper device, wherein the wireless link is an out of band wireless link not communicating within the radio access network; and means for signaling a transfer of credit to the selected at least one helper device to compensate the helper device for providing the wireless device access to the radio access network, wherein the transfer of credit is from at least one of an account associated with the wireless device to the selected at least one helper device and from at least one operator to the selected at least one helper device.

14. The apparatus of claim 13, wherein the means for selecting the at least one helper device further includes means for transmitting information to and receiving information from one or more of the plurality of helper devices in order to determine the suitability of each of the plurality to be used as a helper.

15. The apparatus of claim 14, wherein the information transmitted and received includes at least one of:

a data rate, delay, and throughput per power efficiency of in band radio access links of at least one of wireless device and the at least one helper device;

data rate, delay, and throughput per power efficiency of the out of band wireless link between the wireless device and the at least one helper device; and radio access network and cell identifiers of at least one of the wireless device and the at least one helper device.

16. The apparatus of claim 13, further comprising:

means for determining a total amount of link energy for the out of band wireless link and the radio access link energy of at the selected at least one helper device for at least one helping session; and means for calculating an amount of credit transferred based on the total amount of link energy and a profit margin set by the selected at least one helper device.

17. The apparatus of claim 16, wherein the link energy is a normalized value in units of joules.

18. The apparatus of claim 13, wherein the means for signaling the transfer of credit includes an application causing micropayment transfers of credit from at least one of an account associated with the wireless device and at least one operator of the radio access network to an account associated with the selected at least one helper device.

19. A computer program product comprising:

a non-transitory computer-readable medium comprising:

code for causing a computer to determine within a wireless device one or more helper wireless devices in a radio access network capable of assisting the wireless device in a radio access network to obtain improved radio access network service for the wireless device via a respective link of the one or more helper devices with the radio access network, wherein improvement of the radio access network service includes increasing the throughput of the wireless device which is already in existing in-band wireless communication with the radio access network;

code for causing a computer to select at least one helper device of the determined one or more helper wireless devices to assist the wireless device in obtaining improved service from the radio access network;

code for causing a computer to establish a wireless link between the wireless device and the selected at least one helper device allowing the wireless device to communicate with the network via the at least one helper device, wherein the wireless link is an out of band wireless link not communicating within the radio access network; and code for causing a computer to signal a transfer of credit to the selected at least one helper device to compensate the helper device for providing the wireless device access to the radio access network, wherein the transfer of credit is from at least one of an account associated with the wireless device to the selected at least one helper device and from at least one operator to the selected at least one helper device.

20. A method for providing improved service to a wireless device in a radio access network, the method comprising:

receiving a request sent by another primary wireless device for improved service from a radio access network by using a radio access network connection of the wireless device;

establishing an out of band wireless link between the wireless device and the primary wireless device allowing the primary wireless device to utilize the radio access network connection of the wireless device for access to the radio access network; and receiving a transfer of credit from at least one of the primary device and an operator of the radio access network for providing the primary device access to the radio access network, wherein the transfer of credit is from at least one of an account associated with the primary device and an account associated with the operator;

wherein improvement of the radio access network service includes increasing the throughput of the wireless device which is already in existing in-band wireless communication with the radio access network.

21. The method of claim 20, further comprising:

prior to receiving the request, transmitting information to and receiving information from the primary wireless device in order to determine the suitability of the wireless to assist the primary device.

22. The method of claim 21, wherein the information transmitted and received includes at least one of:

a data rate, delay, and throughput per power efficiency of in band radio access links of at least one of wireless device and the at least one helper device;

data rate, delay, and throughput per power efficiency of the out of band wireless link between the wireless device and the at least one helper device; and radio access network and cell identifiers of at least one of the wireless device and the primary device.

23. The method of claim 20, further comprising:

receiving the transfer of credit from at least one of the primary device and an operator of the radio access network based at least on energy costs associated with providing the primary device access to the radio access network and at least a desired profit margin determined by a user of the wireless device.

24. The method of claim 23, wherein the profit margin is set at or below a maximum value of the profit margin determined based on energy costs associated with at least one helping session involving the wireless device acting to assist a primary device, energy costs associated with at least one helping session where the wireless device acts as a primary device receiving help from the primary device for access to the radio access network, an energy cost if at least one of the helping sessions did not occur, and an opportunity cost.

25. The method of claim 23, wherein a maximum value of the profit margin is determined based on the following equation:

$$\alpha \leq (epoor - eC2)/(eC2 - eC2),$$

where $\alpha$ denotes the profit margin, epoor denotes the energy that would be spent if at least one helping session did not occur; eC1 denotes the energy spent by the wireless device on a radio access network (RAN) access link in a first helping session where the device helps the primary device for RAN access; and eC2 denotes the energy spent on the RAN access link by the primary wireless device in a subsequent second helping session where the primary wireless device serves as a helper device to help the wireless device for RAN access.

26. The method of claim 23, wherein the amount of credit transferred from the primary device is based on a total amount of link energy of the out of band link and an in band link for RAN access by wireless device and the desired profit margin.

27. The method of claim 23, wherein receiving a transfer of credit from the operator of the radio access network is based at least on the product of a value of extra revenue gained by the operator due to at least one helping session and a percentage of the extra revenue that the operator transfers to the helper device as incentive to encourage future helping sessions.

28. The method of claim 27, wherein the percentage of the extra revenue that the operator transfers to the helper device is between a predetermined minimum configured to provide a minimum level of incentive to the helper device and a predetermined maximum configured to limit free rider users.

29. The method of claim 27, wherein the percentage of the extra revenue that the operator transfers to the helper device as incentive is determined based on the following relationship:

$$\gamma \geq (1+\alpha)[(eC2 - eC1)/(epoor - eC1)]$$

where $\gamma$ denotes the percentage of extra revenue, $\alpha$ denotes the desired profit margin, epoor denotes the energy that would be spent if at least one helping session did not occur; eC1 denotes the energy spent by the wireless device on a radio access network (RAN) access link in a first helping session where the device helps the primary device for RAN access; and eC2 denotes the energy spent on the RAN access link by the primary wireless device in a subsequent second helping session where the primary wireless device serves as a helper device to help the wireless device for RAN access.

30. The method of claim 23, wherein the energy costs are normalized to an energy value in units of joules.

31. An apparatus for providing improved service to a wireless device in a radio access network, the apparatus comprising:

means for receiving a request sent by another primary wireless device for improved service from a radio access network by using a radio access network connection of the wireless device;

means for establishing an out of band wireless link between the wireless device and the primary wireless device allowing the primary wireless device to utilize the radio access network connection of the wireless device for access to the radio access network; and means for receiving a transfer of credit from at least one of the primary device and an operator of the radio access network for providing the primary device access to the radio access network, wherein the transfer of credit is from at least one of an account associated with the primary device and an account associated with the operator;

wherein improvement of the radio access network service includes increasing the throughput of the wireless device which is already in existing in-band wireless communication with the radio access network.

32. The apparatus of claim 31, further comprising:
means for transmitting information to and receiving information from the primary wireless device in order to determine the suitability of the wireless to assist the primary device prior to receiving the request by the means for receiving.

33. The apparatus of claim 32, wherein the information transmitted and received includes at least one of:
a data rate, delay, and throughput per power efficiency of in band radio access links of at least one of wireless device and the at least one helper device;
data rate, delay, and throughput per power efficiency of the out of band wireless link between the wireless device and the at least one helper device; and
radio access network and cell identifiers of at least one of the wireless device and the primary device.

34. The apparatus of claim 31, further comprising:
means for receiving the transfer of credit from at least one of the primary device and an operator of the radio access network based at least on energy costs associated with providing the primary device access to the radio access network and at least a desired profit margin determined by a user of the wireless device.

35. The apparatus of claim 34, wherein the profit margin is set at or below a maximum value of the profit margin determined based on energy costs associated with at least one helping session involving the wireless device acting to assist a primary device, energy costs associated with at least one helping session where the wireless device acts as a primary device receiving help from the primary device for access to the radio access network, an energy cost if at least one of the helping sessions did not occur, and an opportunity cost.

36. The apparatus of claim 34, wherein a maximum value of the profit margin is determined based on the following equation:

$$\alpha \leq (epoor-eC2)/(eC2-eC1),$$

where $\alpha$ denotes the profit margin, epoor denotes the energy that would be spent if at least one helping session did not occur; eC1 denotes the energy spent by the wireless device on a radio access network (RAN) access link in a first helping session where the device helps the primary device for RAN access; and eC2 denotes the energy spent on the RAN access link by the wireless device in a subsequent second helping session where the wireless device serves to help the primary device for RAN access.

37. The apparatus of claim 34, wherein the amount of credit transferred from the primary device is based on a total amount of link energy of the out of band link and an in band link for RAN access by wireless device and the desired profit margin.

38. The apparatus of claim 34, wherein receiving a transfer of credit from the operator of the radio access network is based at least on the product of a value of extra revenue gained by the operator due to at least one helping session and a percentage of the extra revenue that the operator transfers to the helper device as incentive to encourage future helping sessions.

39. The apparatus of claim 38, wherein the percentage of the extra revenue that the operator transfers to the helper device is between a predetermined minimum configured to provide a minimum level of incentive to the helper device and a predetermined maximum configured to limit free rider users.

40. The apparatus of claim 38, wherein the percentage of the extra revenue that the operator transfers to the helper device as incentive is determined based on the following relationship:

$$\gamma \geq (1+\alpha)[(eC2-eC1)/(epoor-eC1)]$$

where $\gamma$ denotes the percentage of extra revenue, $\alpha$ denotes the desired profit margin, epoor denotes the energy that would be spent if at least one helping session did not occur; eC1 denotes the energy spent by the wireless device on a radio access network (RAN) access link in a first helping session where the device helps the primary device for RAN access; and eC2 denotes the energy spent on the RAN access link by the primary wireless device in a subsequent second helping session where the primary wireless device serves as a helper device to help the wireless device for RAN access.

41. The apparatus of claim 34, wherein the energy costs are normalized to an energy value in units of joules.

42. An apparatus for providing improved service to a wireless device in a radio access network, the apparatus comprising:
at least one processor configured to:
receive a request sent by another primary wireless device for improved service from a radio access network by using a radio access network connection of the wireless device;
establish an out of band wireless link between the wireless device and the primary wireless device allowing the primary wireless device to utilize the radio access network connection of the wireless device for access to the radio access network; and
receive a transfer of credit from at least one of the primary device and an operator of the radio access network for providing the primary device access to the radio access network;
a memory in communication with the at least one processor, wherein the transfer of credit is from at least one of an account associated with the primary device and an account associated with the operator;
wherein improvement of the radio access network service includes increasing the throughput of the wireless device which is already in existing in-band wireless communication with the radio access network.

43. A computer program product comprising:
a non-transitory computer-readable medium comprising:
code for causing a computer to receive a request in a wireless device sent by another primary wireless device for improved service from a radio access network by using a radio access network connection of the wireless device; and
code for causing a computer to establish an out of band wireless link between the wireless device and the primary wireless device allowing the primary wireless device to utilize the radio access network connection of the wireless device for access to the radio access network; and
code for causing a computer to receive a transfer of credit from at least one of the primary device and an operator of the radio access network for providing the primary device access to the radio access network, wherein the transfer of credit is from at least one of an account associated with the primary device and an account associated with the operator;

wherein improvement of the radio access network service includes increasing the throughput of the wireless device which is already in existing in-band wireless communication with the radio access network.

\* \* \* \* \*